March 23, 1965  C. D. CURTIS  3,175,104
HIGH VOLTAGE ELECTRIC GENERATOR
Filed April 16, 1962

INVENTOR.
Cyril D. Curtis
BY
Roland A. Anderson
Attorney 3,175,104
HIGH VOLTAGE ELECTRIC GENERATOR
Cyril D. Curtis, Madison, Wis., assignor to the United States of America as represented by the United States Atomic Energy Commission
Filed Apr. 16, 1962, Ser. No. 187,996
9 Claims. (Cl. 307—109)

This invention relates to electric generators and more specifically to high voltage electric generators. Several types of high voltage generators are available today. The Greinacher-Cockroft-Walton voltage multiplying circuit and other similar cascade circuits generate higher voltages by using additional stages or higher voltage sources. There are electromechanical systems, U.S. Patent 2,467,744, wherein a variable capacitor receives a charge from a fixed voltage source during one part of each cycle and generates a voltage in the other part of each cycle. The magnitude of the generated voltage therefrom is determined by the capacity ratio of the variable capacitor and the source voltage. There is the Van de Graaff generator wherein a moving carrier transports a charge which is deposited on a metal dome. The moving carrier is a belt which is limited in its charge transport capability. For a constant load impedance, none of the above described devices are capable of generating an arbitrarily high voltage (subject to breakdown of the components) without cascaded components and without dependence on the magnitude of any voltage source.

It is therefore one object of the present invention to provided an electric generator capable of generating an arbitrarily high voltage.

It is another object of the present invention to provide an electric generator capable of generating an arbitrarily high voltage without cascading components.

It is still another object of the present invention to provide an electric generator capable of generating an arbitrarily high voltage independent of the magnitude of any voltage source.

Other objects of the present invention will become more apparent as the detailed description proceeds.

In general, the present invention comprises a variable capacitor whose capacitance is cyclically varied and two fixed capacitors. An initial charge is placed on one or more of the capacitors. Means are provided to series connect the fixed capacitors across the variable capacitor responsive to the decrease in capacitance thereof and to parallel connect the fixed capacitors across the variable capacitor responsive to the increase in capacitance thereof, whereby the charge on the variable capacitor is increased. The output of the generator is taken across the variable capacitor.

Further understanding of the invention will best be obtained from consideration of the accompanying drawings in which.

Figure 1:
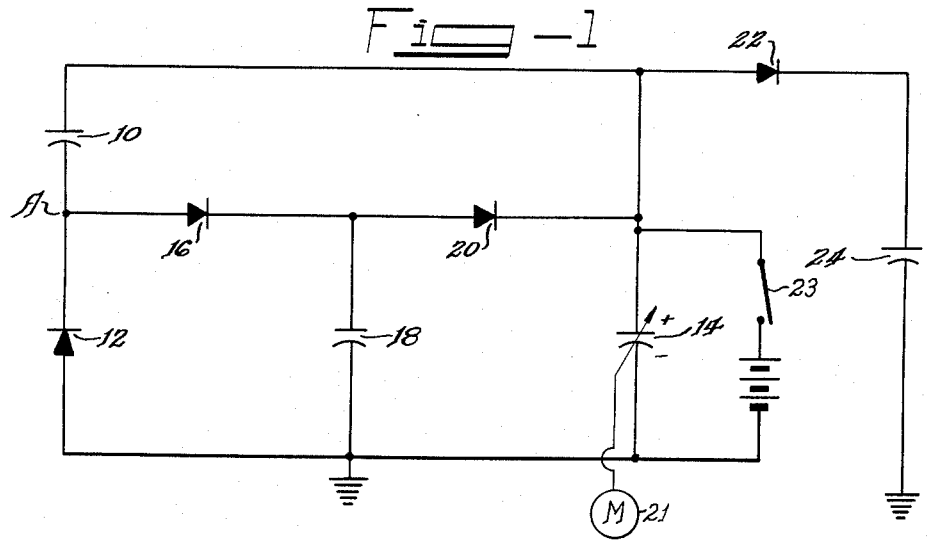
FIGURE 1 is a circuit diagram of the device for the present invention.

Reference is made to FIGURE 1 wherein is illustrated an electrical schematic of a positive voltage generator for the present invention. A fixed capacitor 10 has one side thereof connected to the cathode of a diode 12; the other side of the capacitor 10 is connected through a variable capacitor 14 to the anode of diode 12. The anode of the diode 12 is grounded. The anode of a second diode 16 is connected to the cathode of diode 12 and the cathode of diode 16 is connected through a second fixed capacitor 18 to the anode of diode 12. A third diode 20 has its anode connected to the cathode of diode 16 and its cathode connected to the common junction of capacitors 10 and 14. The output of the generator is taken across the variable capacitor 14. A negative generator will result if the direction of the diodes 12, 16, and 20 is reversed or if the common connection between capacitors 10 and 14 is grounded instead of the junction of capacitors 14 and 18 as shown.

In operation, a motor 21 or other such suitable means drives the variable capacitor 14 so that the capacitance thereof is cyclically varied through its maximum and minimum value. An external voltage source 23 is used to provide an initial charge to one or more of the capacitors 10, 14, or 18. As the capacitance of variable capactor 14 is decreased, the diodes 12, 16, and 20 operate to connect the fixed capacitors 10 and 18 in series across the variable capacitor 14 so that the variable capacitor discharges into them until its capacitance is at a minimum. As the capacitance of variable capacitor 14 increases, the diodes 12, 16, and 20 now operate to connect the capacitors 10 and 18 in parallel across the variable capacitor 14 whereby they discharge into the variable capacitor 14 until their voltages are the same. Variable capacitor 14 thereby acquires an increased voltage during each cycle. This voltage increase will continue unless regulated and will reach an arbitrarily high voltage subject to breakdown of the components.

Figure 2:
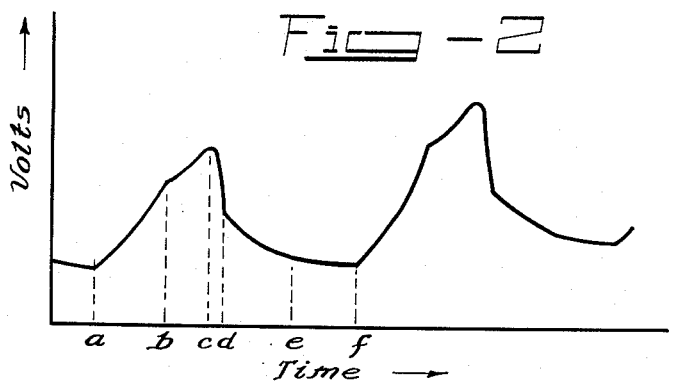
FIGURE 2 is a waveform plot for the device of FIGURE 1.

The operation of the device of FIGURE 1 may be further illustrated by referring to FIGURE 2 wherein the output voltage waveform of the device of FIGURE 1 as measured across variable capacitor 14 is shown. Starting at the lowest voltage point (maximum capacitance of variable capacitor 14) which is at the time $a$ in FIGURE 2, all the capacitors 10, 14, and 18 are charged to the same voltage $v$ with the point A of FIGURE 1 being at ground potential. As the variable capacitor 14 is driven and its capacitance reduced to its minimum value, the voltage of variable capacitor 14 increases because of the relation $v=Q/c$. This continues until time $b$ of FIGURE 2 when point A of FIGURE 1 has risen to potential $v$. At this time, diode 16 conducts and variable capacitor 14 discharges into capacitors 10 and 18 in series until time $c$ of FIGURE 2 when the capacitance of variable capacitor 14 is at a minimum. Charge $q$ has, at this time, left variable capacitor 14 and, for unloaded operation of the generator, capacitors 10 and 18 have each gained charge $q$. The voltages across capacitors 10 and 18 have been increased to $$v+\frac{q}{C_{10}} \text{ and } v+\frac{q}{C_{18}}$$

respectively and the voltage of variable capacitor 14 has a maximum value of $$2v+\frac{qC_{10}C_{18}}{C_{10}+C_{18}}$$

The capacitance of variable capacitor 14 now commences to increase and its voltage drops until a time $d$ is reached when its voltage has reached the voltage across capacitors 10 or 18, whichever is the larger. If capacitor 10 is larger than capacitor 18, then capacitor 18 begins to discharge into the variable capacitor 14. The voltage across variable capacitor 14 will continue to decrease until point A of FIGURE 1 reaches ground potential at time $e$ in FIGURE 2, at which point capacitor 10 begins to discharge into variable capacitor 14. Capacitors 10 and 18 continue to discharge in parallel into variable capacitor 14 until time $f$ when the voltage of variable capacitor 14 is at a minimum (its capacitance is at a maximum) and the voltages of all the capacitors 10, 14, and 18 are again equal but are now greater than the initial voltage $v$.

During the cycle, variable capacitor 14 gains a net charge and if an accounting is made for the charge, the new voltage $v'$ across variable capacitor 14 may be given in terms of the initial voltage $v$ thereon as, $$v' = v\left\{1 + (1-2r)\frac{C_s}{C_s + C_{min}}\left[\frac{C_{max}}{C_{max} + C_{10} + C_{18}}\right]\right\}$$

where $r$ = ratio of minimum to maximum capacitance of variable capacitor 14

$$\left(\frac{C_{min}}{C_{max}}\right)$$

and $C_s$ is the series capacitance of $C_{10}$ and $C_{18}$. It is obvious that for voltage multiplication the minimum to maximum capacitance ratio ($r$) for variable capacitor 14 must be less than one-half.

Proper choice of values for capacitors 10 and 18 results in maximizing the rate for voltage build-up. For no load conditions, differentiation of $v'$, first with respect to $C_{10}$ and $C_s$ held constant, and then with respect to $C_s$, yields the result, $$C_{10} = C_{18} = 2C_s = \sqrt{C_{min} C_{max}}$$

so that $$v' = v\left\{1 + \frac{1-2r}{(1+2\sqrt{r})^2}\right\}$$

and as the limit of $r \to 0$, the voltage doubles every cycle.

The output voltage as shown in FIGURE 2 is D.-C. with a large A.-C. component. The harmonic content of the A.-C. component is determined by the manner in which the variable capacitor 14 varies with time, which in turn is affected by the geometry of the capacitor itself. During build-up, the voltage waveform of FIGURE 2 increases as $v(1+F)^n$ where $v$ is the voltage at a chosen point in the reference cycle, F is the fractional voltage increase per cycle and $n$ is the number of cycles measured from the reference time. This voltage growth is slowed down with time if a non-linearity develops, such as a decrease of load or leakage resistance with increasing voltage. Otherwise the growth in voltage continues indefinitely as long as values of the circuit elements and the variable capacitor 14 frequency remain constant. The output voltage will level off at an equilibrium level if the variable capacitor 14 frequency decreases sufficiently, the load impedance reduces, or a capacitor value changes appropriately during operation. Automatic regulation for the generator may therefore be designed around these changes.

Turning now to the application of a load to the generator of FIGURE 1, a rectifier 22 and a filter capacitor 24 are added to give a constant output voltage with a value near the peak value of the output across the variable capacitor 14. Any more sophisticated filter may of course be added.

For a constant load impedance, the generator works or does not work depending upon the load size. When it works, the output voltage continues to grow indefinitely as long as the frequency of the variable capacitor 14 remains constant. Reduction in the load impedance causes the voltage output to level off. With a load applied to the generator of FIGURE 1, the charge that flows from the variable capacitor 14 for each cycle thereof is $$q = \frac{C_s C_{max}}{C_s + \lambda C_{min}}(1-2r)v$$

$\lambda$ being defined as the fraction of the charge $q$ which leaves the variable capacitor 14 and flows into capacitors 10 and 18 in series ($C_s$). Thus $\lambda q$ flows into $C_{10}$ and $C_{18}$ in series and $(1-\lambda)q$ flows into the load. The net charge gained by variable capacitor 14 for each cycle thereof is $$\Delta q = \frac{qC_{max}}{C_{max} + C_{10} + C_{18}}(2\lambda - 1)$$

Thus, the generator output voltage levels off when $\lambda$ is reduced to a value of one-half. The charge to the load then becomes $$q_{load} = \frac{1}{2}q = \frac{C_s C_{max}}{2C_s + C_{min}}(1-2r)v$$

Here, $v$ is the voltage across variable capacitor 14 at its point of highest capacitance and is related to the maximum voltage $v'$ at the point of minimum capacitance by $$v = \frac{2C_s + C_{min}}{4C_s + C_{max}}v'$$

The average current of the load thus becomes $$I = q_{load} f = \frac{C_s C_{max}}{4C_s + C_{max}}(1-2r)fv'$$

thereby establishing the minimum impedance of the load for operation at any constant voltage.

Figure 3:
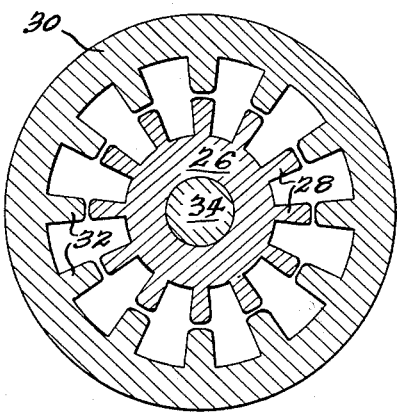
FIGURE 3 is a physical representation of a variable capacitor especially suitable for the device of FIGURE 1.

FIGURE 3 is a sketch of a variable capacitor for use in the circuit of FIGURE 1 where an increase of power is desired. The variable capacitor comprises a rotor 26 having axial ridges 28 and a stator 30 having axial ridges 32. The rotor 26 is driven from an external motor (not shown) coupled to the drive shaft 34 of the rotor 26. If the number of ridges on the rotor 26 and stator 30 is N and the revolutions per second is R then the frequency of the capacitor is $f = NR$.

In the construction of the variable capacitor of FIGURE 3 the minimum gap separation ($s$) between the ridges of stator 30 and rotor 26 is set by practical tolerance limits. It is approximately 0.005 inch for small rotors and somewhat greater for larger rotors. Generally the ridges of stator 30 and rotor 26 should have a width of about 45 $s$ and a depth of about 90 $s$. Adjacent ridges on the stator 30 should have a separation of approximately 90 $s$, and similarly adjacent ridges on rotor 26 should have a separation of 90 $s$. Each ridge should have a slightly oval surface to prevent sparking as the ridges on rotor 26 and stator 30 approch each other at higher than minimum voltage. The average gap spacing between the stator ridges 32 and rotor ridges 28 is slightly larger than $s$, approximately 1.5 $s$.

For a one-foot long rotor, one-foot in diameter having a revolution rate of 3600 r.p.m. and operated in a vacuum in the circuit of FIGURE 1, the output should be approximately 2 kva. with a peak voltage of approximately 35 kv.

The power should scale as the square of the rotor radius and as the rotor length for a constant gap between capacitor ridges. Higher voltages may be obtained by increasing the minimum gap spacing in a single variable capacitor or by cascading several such capacitors. The former method gives an increased voltage with less power output. The latter method gives both, increased voltage and increased power, both proportional to the number of cascaded stages.

Person skilled in the art will, of course, adapt the teachings of the invention to embodiments far different from those illustrated. Accordingly, the scope of protection afforded the invention should not be limited to the particular embodiments thereof shown in the drawings and described above but shall be determined only in accordance with the appended claims.

What is claimed is:

1. An electric generator comprising a variable capacitor, means for cyclically varying the capacitance of said variable capacitor, first and second fixed capacitors, means for applying an initial charge to said capacitors, means for series discharging said variable capacitor into said first and second capacitors responsive to the varying capacitance of said variable capacitor, and means for parallel discharging said first and second capacitors into said variable capacitor responsive to the varying capacitance of said variable capacitor, whereby the charge on said variable capacitor is increased, the output of said generator being taken across said variable capacitor.

2. An electric generator comprising a variable capacitor, means for cyclically varying the capacitance of said variable capacitor, first and second fixed capacitors, means for applying an initial charge to said capacitors, means responsive to the decrease in capacitance of said variable capacitor for series connecting said first and second capacitors across said variable capacitor whereby said variable capacitor discharges into said first and second capacitors, and means responsive to the increase in capacitance of said variable capacitor for parallel connecting said first and second capacitors across said variable capacitor whereby said first and second capacitors discharge into said variable capacitor and increase the charge thereon, the output of said generator being taken across said variable capacitor.

3. An electric generator comprising a variable capacitor; means for cyclically varying the capacitance of said variable capacitor; first and second fixed capacitors; means for applying an initial voltage to said capacitors; and first, second, and third diodes adapted to switch said first and second capacitors in series connection across said variable capacitor responsive to the decrease in capacitance thereof and in parallel connection across said variable capacitor responsive to the increase in capacitance thereof, whereby the charge on said variable capacitor is increased, the output of said generator being taken across said variable capacitor.

4. An electric generator comprising a variable capacitor, means for cyclically varying the capacitance of said variable capacitor, a first diode, a first capacitor connected in series with said first diode across said variable capacitor, a second diode, a second capacitor connected in series with said second diode across said first diode, a third diode connected across the junction of said second diode and said second capacitor and the junction of said variable capacitor and said first capacitor, and means for applying an initial voltage to said capacitors, said diodes series discharging said variable capacitance into said first and second capacitors responsive to the decrease in capacitance of said variable capacitor and parallel discharging said first and second capacitors into said variable capacitor responsive to the increase in capacitance of said variable capacitor, whereby the charge on said variable capacitor is increased, the output of said generator being taken across said variable capacitor.

5. The device according to claim 4 wherein the ratio of minimum to maximum capacitance of said variable capacitor is less than one-half.

6. An electric generator comprising a variable capacitor, means for cyclically varying the capacitance of said variable capacitor, a first fixed capacitor, a first diode having the plate thereof connected to one side of said variable capacitor, the cathode of said first diode being connected through said first capacitor to the other side of said variable capacitor, a second fixed capacitor, a second diode having the plate thereof connected to the cathode of said first diode, the cathode of said second diode being connected through said second capacitor to the plate of said first diode, a third diode having the plate thereof connected to the cathode of said second diode, the cathode of said third diode being connected to the common junction of said first capacitor and said variable capacitor, and means for applying an initial charge to said capacitors, the output of said generator being taken across said variable capacitor.

7. The device according to claim 6 wherein the ratio of the minimum to maximum capacitance of said variable capacitor is less than one-half.

8. An electric generator comprising a variable capacitor, means for cyclically varying the capacitance of said variable capacitor, a plurality of fixed capacitors, means for applying an initial charge to at least one of said capacitors, means for discharging said varaible capacitor into said fixed capacitors responsive to the cyclically varying capacitance of said variable capacitor, and means for parallel connecting said plurality of capacitors across said variable capacitor responsive to the increase in capacitance thereof, whereby said plurality of capacitors discharge into said variable capacitor and the charge on said variable capacitor is increased, the output of said generator being taken across said variable capacitor.

9. The device according to claim 8 wherein said variable capacitor discharging means comprises means for series connecting said plurality of capacitors across said variable capacitor responsive to the decrease in capacitance thereof, whereby said variable capacitor discharges into said plurality of capacitors.

References Cited by the Examiner

UNITED STATES PATENTS 3,107,326   10/63   Denholm _____ 320—1 X

IRVING L. SRAGOW, *Primary Examiner.*